(12) United States Patent
Hanson

(10) Patent No.: US 7,657,834 B2
(45) Date of Patent: Feb. 2, 2010

(54) SENSITIVITY LABEL TRANSLATION

(75) Inventor: Chad J. Hanson, Champaign, IL (US)

(73) Assignee: Trusted Computer Solutions, Herndon, VA (US)

( * ) Notice: Subject to any disclaimer, the term of this patent is extended or adjusted under 35 U.S.C. 154(b) by 598 days.

(21) Appl. No.: 11/169,930

(22) Filed: Jun. 29, 2005

(65) Prior Publication Data

US 2007/0005780 A1    Jan. 4, 2007

(51) Int. Cl.
*G06F 17/21* (2006.01)
(52) U.S. Cl. .................... 715/255; 715/200; 715/209; 715/234; 707/1; 707/9; 707/10
(58) Field of Classification Search .............. 715/200, 715/209, 234, 255; 707/1, 9, 10
See application file for complete search history.

(56) References Cited

U.S. PATENT DOCUMENTS

| | | | |
|---|---|---|---|
| 5,903,732 A * | 5/1999 | Reed et al. .................. 709/229 |
| 6,948,070 B1 * | 9/2005 | Ginter et al. ................ 713/193 |
| 7,178,025 B2 * | 2/2007 | Scheidt et al. .............. 713/168 |
| 2003/0014466 A1 * | 1/2003 | Berger et al. ................ 709/102 |
| 2004/0025016 A1 * | 2/2004 | Focke et al. ................. 713/164 |
| 2005/0138423 A1 * | 6/2005 | Ranganathan ............... 713/201 |
| 2007/0056036 A1 * | 3/2007 | Focke et al. .................... 726/22 |

OTHER PUBLICATIONS

"Translating Labels," Feb. 2004, "Trusted Solaris Developer's Guide," Sun Microsystems.*
"Trusted Solaris Security Mechanisms," Feb. 2004, "Trusted Solaris Developer's Guide," Sun Microsystems.*
Hanson, "SELinux and MLS", Mar. 2, 2005, SELinux Symposium.*
Microsoft Excel Help Files, 2003, Microsoft Corporation, Microsoft Office Professional Edition 2003.*

* cited by examiner

*Primary Examiner*—Joshua D Campbell
(74) *Attorney, Agent, or Firm*—Woodcock Washburn LLP

(57) ABSTRACT

A Sensitivity Label Translation system allows internal Compartmented Mode Workstation (CMW) format labels to be translated to SELinux policy labels and vice-versa. This translation occurs by mapping the internal CMW bit-mapped representation to predefined SELinux policy strings and vice-versa. Particular enabled CMW categories are converted into SELinux category strings and vice-versa. The respective category values and policies are unaffected.

13 Claims, 1 Drawing Sheet

SENSITIVITY LABEL TRANSLATION

FIELD OF THE INVENTION

The invention relates to computer systems and software for handling documents and communications with different levels of classified information and, more particularly, to a trusted computer system and software for translating sensitivity labels for documents and communications from/to a CMW representation to/from an SELinux representation.

BACKGROUND OF THE INVENTION

In the Department of Defense (DOD) community, security policies govern the protection and handling of classified information. These policies can be found in such documented procedures as the DoD Information Technology Security Certification & Accreditation Process (DITSCAP) and the Director of Central Intelligence Directive (DCID) 6/3. Trusted operating systems that use an enhanced data access control system (like Trusted Solaris or Trusted Linux) electronically "tag" data with a classification label, sometimes referred to as a classification level. (The terms "level" and "label" will be used interchangeably herein.) This label is used to control access to data and files, limiting access to only those users specifically authorized.

In the intelligence community, proper labeling of classified information is very important. The method to achieve proper labeling is complex and therefore a language format was created by the Defense Intelligence Agency (DIA). This format is known as Compartmented Mode Workstation (CMW) Labeling: Encoding Format (Release 2.2). This format was released from MITRE along with an accompanying software suite, MITRE CMW Labeling Software R2.2.1, which provides a bi-directional method to convert human-readable labels in the above-mentioned Encoding Format to an internal CMW representation. This software handles encodings for sensitivity labels, information labels, clearances, channels, print banners, and accreditation ranges. The internal CMW format is used to describe a machine that meets the DoD CMW Evaluation Criteria (DDS-2600-6243-92). The CMW systems use the internal CMW representation natively for security decisions. The internal CMW format consists of two main components: Classification and Compartments ("Need to Know"). The classification is an integer value and the compartments are a list (or array) of members containing at least 64 entries.

On the other hand, Security Enhanced Linux (SELinux) is a mandatory access control (MAC) technology from the National Security Agency (NSA) that is integrated in the Linux Kernel. Both SELinux and CMW technologies rely on a MAC framework to provide strong security. SELinux is a policy driven technology, i.e. a single policy defines all of the interactions on the system. The SELinux representation of sensitivity labels is defined in the policy configuration.

Unfortunately, no technique exists for readily translating from the internal CMW representation, as defined by the CMW Labeling Software, to a SELinux policy representation, thus limiting system interactivity. The Sensitivity Label Translation system of the invention provides a method to perform such a translation, thereby addressing a significant need in the art.

SUMMARY OF THE INVENTION

The Sensitivity Label Translation system of the invention addresses the needs in the art by providing a technique for performing a bidirectional translation between the internal CMW representation of labels provided by the CMW labeling software and the SELinux policy representation. The Sensitivity Label Translation system of the invention allows users familiar with and that need the functionality of the CMW labeling software to utilize their existing encodings on a SELinux system and vice-versa.

The method of the invention translates from the Compartmented Mode Workstation (CMW) format to the SELinux format by converting the human-readable CMW label to an internal CMW format, converting the classifications in the CMW format into corresponding classifications in the SELinux format, and translating enabled categories in the CMW format into category strings in the SELinux format. A system and a computer readable medium containing software for performing the method of the invention are also within the scope of the invention.

Conversely, the method of the invention translates from an SELinux Label String to the Compartmented Mode Workstation (CMW) format by converting the classification in the SELinux format into the corresponding internal CMW format, converting the category strings in the SELinux format into corresponding enabled categories in the internal CMW format, and translating the internal CMW format into human-readable CMW labels. A system and a computer readable medium containing software for performing the method of the invention are also within the scope of the invention.

A system and method for implementing these individual features will be described in detail below.

BRIEF DESCRIPTION OF THE DRAWINGS

The foregoing summary, as well as the following detailed description of the invention, is better understood when read in conjunction with the appended drawings. For the purpose of illustrating the invention, the drawings include exemplary embodiments of various aspects of the invention; however, those skilled in the art will appreciate that the invention is not limited to the specific methods and instrumentalities disclosed. In the drawings.

DETAILED DESCRIPTION OF ILLUSTRATIVE EMBODIMENTS

Figure 1:
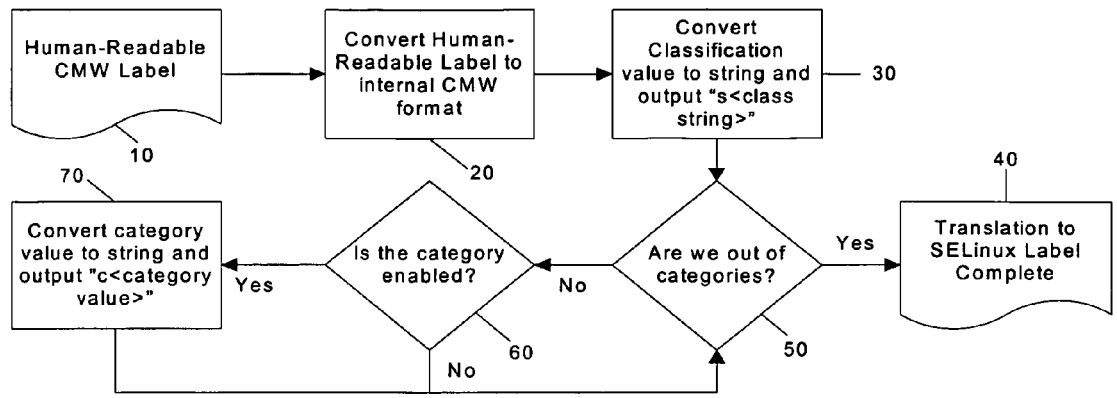
FIG. 1 illustrates a flowchart of a method of converting from a CMW format to a SELinux format in accordance with the invention.

A detailed description of illustrative embodiments of the present invention will now be described with reference to FIGS. 1-2. Although this description provides detailed examples of possible implementations of the present invention, it should be noted that these details are intended to be exemplary and in no way delimit the scope of the invention. All limitations of the invention are set forth in the appended claims.

Overview of the Invention

The Sensitivity Label Translation system of the invention allows internal CMW format labels to be translated to SELinux policy labels and vice-versa. This translation occurs by mapping the internal CMW bit-mapped representation to predefined SELinux policy strings and vice-versa. In particular, enabled CMW categories are converted into SELinux category strings and vice-versa. The respective category values and policies are unaffected.

CMW Format

The Sensitivity Label Translation system of the invention allows internal CMW format labels to be translated to SELinux policy labels and vice versa. As described herein, a human-readable label is a string in Encodings Format describing the handling restrictions of the information. Some example labels known to those familiar with such labels include: unclassified, confidential accounting, secret rel (releasable to) engineering, etc. Of course, standard DOD labels such as secret, top secret, classified, and unclassified may also be used. Such human readable labels may be translated using the Compartmented Mode Workstation (CMW) Label: Encodings Format to the internal CMW format, which consists of a classification (unclassified, classified, etc.) and a set of compartments (categories) that may be used to define unique categories for the particular implementation. For example, the above labels may be translated using the Compartmented Mode Workstation Label: Encodings Format to the binary mappings shown below.

| Human Readable Label | Classification | Compartments |
| --- | --- | --- |
| unclassified | 1 | 00000000 00000000 00000000 00000000<br>00000000 00000000 00000000 00000000<br>00000000 00000000 00000000 00000000<br>00000000 00000000 00000000 00000000 |
| confidential accounting | 2 | 10000000 00000000 00000000 00000000<br>00000000 00000000 00000000 00000000<br>00000000 00000000 00000000 00000000<br>00000000 00000000 00000000 00000000 |
| Secret rel engineering | 3 | 00000000 00000010 00000000 00000000<br>00000000 00000000 00000000 00000000<br>00000000 00000000 00000000 00000000<br>00000000 10111111 11111111 11111111 |

In these examples, the compartments for unclassified are all zeros while the first bit is a "1" for "confidential." However, in the last example above (secret rel engineering), this label is represented using a technique known as "inverse bits" (represented in the Encoding format by a '~') to remove a member from an initial set. In this example, the secret classification turns on the last 24 bits and allows members to be turned off to restrict access. Also being used in the human readable label is the prefix function to append the string "rel" in front of the compartment value engineering. A sample of the encoding format required to produce these representations is shown below:

```
name= UNCLASSIFIED; value= 1;
name= CONFIDENTIAL; value= 2;
name= SECRET; value= 3; initial compartments= 14 104-127
name= REL; prefix;
name= accounting; compartments= 0;
name= operations; compartments= 1;
name= engineering; compartments= ~105; prefix= REL;
```

SELinux Format

The SELinux policy defines sensitivities and categories as policy strings in the policy as shown below:
 sensitivity mystring;
 category mycategory;

Sensitivities and categories defined in SELinux are mapped to a pre-existing security policy. The exemplary embodiment of the pre-defined security policy is modeled after a binary format and therefore called binary policy strings. For example, the predefined SELinux binary policy strings are shown as follows:
 sensitivity s0;
 sensitivity s1;
 sensitivity s2;
 . . .
 sensitivity s9;
 category c0;
 category c1;
 category c2;
 . . .
 category c127;

where the sensitivities and categories are predetermined by the security policy defining the relationships of persons and subjects within the system. In an exemplary embodiment, binary policy string sensitivity s1 may be unclassified, sensitivity s2 may be confidential, sensitivity s3 may be secret, and the like, while the binary policy string category c0 may be accounting, category c1 may be category operations, and the like.

Sensitivity Label Translation

The Sensitivity Label Translation method of the invention implements a user level software application that uses a library within a Trusted Linux software platform to combine a methodology for interpreting and translating the internal CMW format to a predefined SELinux policy. The predefined policy is modeled after the internal CMW binary mapping format, but instantiated as binary policy strings. In particular, the SELinux label string that combines the sensitivity and category and has the same contents as the above CMW label, is shown as:
 s1
 s2:c0
 s3:c14,c104,c105,c106,c107,c108,c109,c110,c111,c112, c113,c114,c115, c116,c117,c118,c119,c120,c121, c122,c123,c124,c125,c126,c127

In accordance with the invention, if a SELinux label string does not have any compartments, it will not have a colon following the classification value. On the other had, in accordance with the invention a category code is provided in SELinux policy format anywhere a bit is enabled (e.g., has a value of "1" in the example above) is present in the CMW compartment field.

This Sensitivity Label Translation occurs by mapping the internal CMW binary mapping representation to predefined SELinux binary policy strings. This is accomplished by translating the enabled classification and compartment sets to strings. These strings are part of predefined SELinux policy and represent the internal CMW format of label instead of the human readable string.

EXAMPLE

Detailed below is an example showing the transformation of SECRET REL ENGINEERING in CMW format to SELinux policy in accordance with the invention:
 Secret Rel Engineering This human readable form translates to the internal CMW binary mapping format below per a sample label encodings format:

| | |
|---|---|
| 3 | 00000000 00000010 00000000 00000000 |
| | 00000000 00000000 00000000 00000000 |
| | 00000000 00000000 00000000 00000000 |
| | 00000000 10111111 11111111 11111111 |

The Sensitivity Label Translation of the invention changes this to SELinux Binary Policy Format as shown below:

| | |
|---|---|
| S3 | c14, c104, c106, c107, c108, c109, c110, c111, c112, c113, c114, c115, c116, c117, c118, c119, c120, c121, c122, c123, c124, c125, c126, c127 |

Where, for example, c14 is the 15$^{th}$ position in the 128 bit field c0-c127. In the paragraphs below, "SELinux label string" has the same meaning as "binary policy string" and "CMW label" has the same meaning as "binary mapping".

Figure 2:
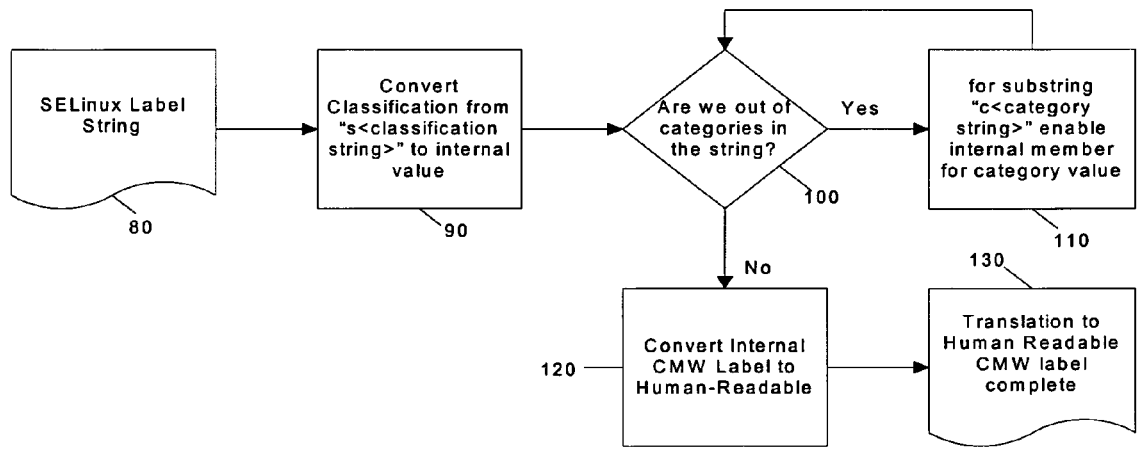
FIG. 2 illustrates a flowchart of a method of converting from a SELinux format to a CMW format in accordance with the invention.

FIG. 1 illustrates a flowchart for the translation from the CMW format to the SELinux format. As shown, the human readable CMW label input at step 10 (e.g., SECRET REL ENGINEERING) is converted at step 20 to the internal CMW format as shown above (e.g., unclassified, confidential, secret, etc.) before being converted to the s<classification value> format of SELinux at step 30 (e.g., s0, s1, etc.). At step 40, it is determined whether all categories (compartments) have been processed. If so, the translation to SELinux Label-String format is completed at step 50; otherwise, the category value is checked at step 60 and, if enabled, the string c<category number> is appended to the SELinux label at step 70. In the example, the final SELinux label string would be:

s3:c14,c104,c106,c107,c108,c109,c110,c151,c112,c113, c114,c115,c116,c117,c118,c119,c120, c121,c122,c123, c124,c125,c126,c127.

as compartmented bits 14, 104, and 106-127 are enabled. This SELinux label string may be shortened to:

s3:c14, c104, c106.c127 as the SELinux Policy Language allows an optimization for category compression in the string using a "." character to specify a beginning and end of a range.

The Sensitivity Label Translation system performs the operations in reverse when converting a SELinux label string to an internal CMW label. FIG. 2 illustrates a flowchart for the translation from the SELinux format to the CMW format. As shown, the received SELinux Label String at step 80 is converted from the s<classification value> to internal CMW value by providing an enabled bit (e.g., a "1" in the example) at each compartment in the category field at step 90. This process is repeated for each compartment by checking at step 100 if there are any unprocessed categories in the input SELinux label string 80 and, if so, enabling the internal value for the respective category number (c<category number>) at step 110. Once all categories have been processed, the internal CMW label is converted into the corresponding human readable label at step 120 before the translation process is completed at step 130.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations. Such programs may be implemented on a processor to form a system as defined herein.

Those skilled in the art will appreciate that other embodiments and features of the invention are possible within the scope of the invention. For example, while an exemplary embodiment has been described in the context of conventional file system where different levels of security protection are provided for different data, those skilled in the art will appreciate that the invention may also be used in a DOD classified data system and in conjunction with other classification schemes where data is converted to/from a category format and a string format. Accordingly, any such modifications are intended to be included within the scope of this invention as defined by the following exemplary claims.

What is claimed:

1. A method of translating from a Compartmented Mode Workstation labeling encoding format to a SELinux policy language format, where the Compartmented Mode Workstation labeling encoding format includes first sensitivity classifications and categories represented as a binary mapping and the SELinux policy language format includes second sensitivity classifications and categories represented as policy strings of a pre-existing security policy defining relationships of persons and subjects within a system, comprising the steps of:

converting a first sensitivity classification to a corresponding second sensitivity classification policy string; and converting each enabled category of the Compartmented Mode Workstation labeling encoding format to a policy string representing the enabled category in the SELinux policy language format.

2. A method as in claim 1, comprising the further step of converting from a human readable sensitivity label to said Compartmented Mode Workstation labeling encoding format by selectively enabling the categories of the Compartmented Mode Workstation labeling encoding format based on the enabled categories in the human readable sensitivity label.

3. A method as in claim 1, comprising the further step of representing the policy strings representing the enabled categories in the SELinux policy language format in a category compression format.

4. A method of translating from a SELinux policy language format to a Compartmented Mode Workstation labeling encoding format, where the SELinux policy language format includes first sensitivity classifications and categories represented as policy strings of a pre-existing security policy defining relationships of persons and subjects within a system and the Compartmented Mode Workstation labeling encoding format includes second sensitivity classifications and categories represented as a binary mapping, comprising the steps of:

converting a first sensitivity classification of the SELinux policy language format to a corresponding second sensitivity classification of the Compartmented Mode Workstation labeling encoding format; and converting each category policy string of the SELinux policy language format to an enabled category in the binary mapping of the Compartmented Mode Workstation labeling encoding format.

5. A method as in claim 4, comprising the further step of converting the Compartmented Mode Workstation labeling encoding format to a human readable sensitivity label by spelling out the enabled categories of the Compartmented Mode Workstation labeling encoding format.

6. A computer readable storage medium comprising:

a first code block that converts a first sensitivity classification of a Compartmented Mode Workstation labeling encoding format to a corresponding second sensitivity classification of a SELinux policy language format, where the Compartmented Mode Workstation labeling encoding format includes first sensitivity classifications and categories represented as a binary mapping and the SELinux policy language format includes second sensitivity classifications and categories represented as policy strings of a pre-existing security policy defining relationships of persons and subjects within a system; and a second code block that converts each enabled category of the Compartmented Mode Workstation labeling encoding format to a policy string representing the enabled category in the SELinux policy language format.

7. A computer readable storage medium as in claim 6, further comprising a third code block that converts a human readable sensitivity label to said Compartmented Mode Workstation labeling encoding format by selectively enabling the categories of the Compartmented Mode Workstation labeling encoding format based on the enabled categories in the human readable sensitivity label.

8. A computer readable storage medium as in claim 6, wherein said second code block represents the policy strings representing the enabled categories in the SELinux policy language format in a category compression format.

9. A computer readable storage medium comprising:

a first code block that converts a first sensitivity classification of a SELinux policy language format to a corresponding second sensitivity classification of a Compartmented Mode Workstation labeling encoding format, where the SELinux policy language format includes first sensitivity classifications and categories represented as policy strings of a pre-existing security policy defining relationships of persons and subjects within a system and the Compartmented Mode Workstation labeling encoding format includes second sensitivity classifications and categories represented as a binary mapping; and a second code block that converts each category policy string of the SELinux policy language format to an enabled category in the binary mapping of the Compartmented Mode Workstation labeling encoding format.

10. A computer readable storage medium as in claim 9, further comprising a third code block that converts the Compartmented Mode Workstation labeling encoding format to a human readable sensitivity label by spelling out the enabled categories of the Compartmented Mode Workstation labeling encoding format.

11. A system for translating between a Compartmented Mode Workstation (CMW) sensitivity level format and a SELinux sensitivity level format, comprising:

a memory that stores sensitivity classification data for processing; and a processor that is programmed to convert a sensitivity classification of the CMW sensitivity level format to a corresponding sensitivity classification of the SELinux sensitivity level format and vice-versa and that is programmed to convert each enabled category in a bit mapping of the CMW sensitivity level format to a policy string representing the enabled category in the SELinux sensitivity level format and vice-versa.

12. A system as in claim 11, wherein said processor is further programmed to convert a human readable sensitivity label to said CMW sensitivity level format by selectively enabling the categories of the CMW sensitivity level format based on the enabled categories in the human readable sensitivity label.

13. A system as in claim 11, wherein said processor is programmed to represent the policy strings representing the enabled categories in the SELinux sensitivity level format in a category compression format.

* * * * *